United States Patent

[11] 3,627,735

| [72] | Inventor | Louis E. Trapasso<br>214 Jefferson Ave., Westfield, N.Y. 10002 |
|---|---|---|
| [21] | Appl. No. | 876,025 |
| [22] | Filed | Nov. 12, 1969 |
| [45] | Patented | Dec. 14, 1971<br>Continuation-in-part of application Ser. No. 537,279, Mar. 25, 1966, now abandoned. This application Nov. 12, 1969, Ser. No. 876,025 |

[54] POLYURETHANE ELASTOMERIC-SHAPED ARTICLES CONTAINING REACTIVE SITES
14 Claims, No Drawings

[52] U.S. Cl............................................. 260/77.5 AM,
260/45.7, 260/45.9, 260/45.95, 260/77.5 AA, 260/77.5 SS, 260/77.5 SP, 260/77.5 AN

[51] Int. Cl........................................................ C08g 22/16, C08g 51/58

[50] Field of Search............................................. 260/75 TN, 75 H, 77.5 AM, 77.5 SP

[56] References Cited
UNITED STATES PATENTS

| 3,461,102 | 8/1969 | Oertel et al.................. | 26/75 |
| 3,461,106 | 8/1969 | Oertel et al.................. | 26/75 |

Primary Examiner—Donald E. Czaja
Assistant Examiner—H. S. Cockeram
Attorneys—Thomas J. Morgan, S. D. Murphy and Louis Gubinsky ABSTRACT: Polymeric elastomers are prepared by chain extension of urethane prepolymer with guanidine. The imino hydrogen in the elastomeric chain is reactive toward isocyanate groups, thereby enabling cross linking and the direct chemical attachment of additives such as dye sites, antioxidants and the like directly to the polymer backbone either prior to or after article forming.

POLYURETHANE ELASTOMERIC-SHAPED ARTICLES CONTAINING REACTIVE SITES

This application is a continuation-in-part of my copending patent application, Ser. No. 537,279, filed Mar. 25, 1966, now abandoned.

This invention relates to the preparation of a new class of urethane elastomers and shaped articles produced therefrom.

Urethane elastomers are segmented block copolymers which comprise alternating "soft" and "hard" segments connected through urethane groups. Although materials of this type have achieved wide commercial acceptance, their relative instability upon exposure to light and air has posed serious problems. Similarly the difficulty, expense and slowness of curing them has often left much to be desired.

It is an object of this invention to produce urethane elastomers which contain in the polymer backbone itself active sites for attachment of light stabilizers, antioxidants, dye sites and the like. It is a further object to have these active sites reactive toward isocyanates under only selective conditions and thus available for subsequent cross linking in a simple inexpensive and quick operation. It is another object of this invention to provide a method for attaching dye sites, light stabilizers, antioxidants and the like to urethane elastomeric polymers and the polymers thereby produced and shaped articles, particularly fibers and films containing such dye sites and the like and produced therefrom. It is a still further object to produce urethane elastomers which have these desirable chemical properties and which also possess good tensile and elastic properties.

These objects have now been realized in novel segmented copolymers obtained by reacting isocyanate terminated urethane prepolymers with guanidine.

The segmented copolymers of the instant invention have repeating structural units of the formula (1):

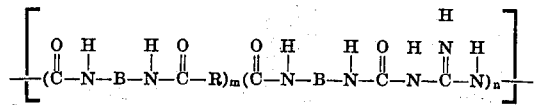

wherein R, the soft block, is the polymeric residue remaining after removal of the terminal active hydrogen atoms for a difunctional organic polymer of the formula (2):

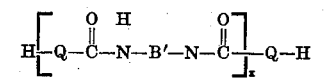

having a melting point below about 60° C. and a molecular weight between about 700 and 5,000 and wherein $x$ has a value of 0, 1 or 2; Q is the polymeric residue remaining after removal of the terminal active hydrogen atoms from a difunctional organic polymer H—Q—H having a melting point below about 60° C. and a molecular weight above about 230; B and B' are nonpolymeric bivalent organic radicals inert to isocyanate groups and represent the residue of the diisocyanate compounds, B (NCO)$_2$ and B' (NCO)$_2$, respectively; and $m$ and $n$ are positive integers, preferably 1.

Representative types of H—Q—H compounds include poly (alkylene oxide) glycols such as polytetrahydrofuran and poly (propylene oxide) glycol; hydroxy terminated polyesters such as polycaprolactone; polyurethanes, polyureas, polyamides, polysulfonamides and polysiloxanes.

Representative organic diisocyanate compounds include diphenyl methane diisocyanate, 2,4-tolylene diisocyanate and hexamethylene diisocyanate. B and B' can be the same or different.

These elastomers may be prepared by reacting a difunctional organic polymer

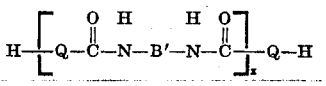

with an organic diisocyanate capping agent B (N=C=O)$_2$ in a molar ratio of about 1 to 2, wherein Q and B are above defined, and then reacting the resultant product (urethane prepolymer) with guanidine to achieve chain extension.

The urethane prepolymers are preferably made by dimerizing or trimerizing a lower molecular weight compound H—Q—H, as above defined, with an organic diisocyanate such as 2,4-tolylene diisocyanate by employing a two or threefold excess, respectively, of H—Q—H, and then capping the ends with the same or another organic diisocyanate. The preferred molecular weight of the soft block R is 1,000 to 3,000.

The chain extension step may be carried out by mixing approximately equimolar amounts of the urethane prepolymer and guanidine directly, or preferably, dissolved in a solvent such as methylene chloride, dioxane, N,N-dimethylformamide, N,N-dimethylacetamide, tetrahydrofuran, dimethylsulfoxide, or tetramethylurea or their solvent mixtures. It is preferred to work with a slight excess of guanidine. The molecular weight can be controlled by such factors as the relative amounts of urethane prepolymer and guanidine, the choice of the solvent system, the period of reaction and the temperature. The temperature of reaction should be 0° to 50° C., preferably 0° to 20° C. In place of guanidine itself, suitable guanidinium salts such as guanidinium carbonate can be employed.

Although diamines have previously been employed as chain extenders, guanidine is not an ordinary diamine. Rather it is commonly regarded as an imino derivative of urea. It is the strongest organic base known and is monobasic rather than dibasic like other diamines. Prior art workers excluded from the list of chain-extending agents, compounds containing more than two atoms having attached thereto active hydrogen atoms.

The unique chemistry of guanidine results in several highly desirable chemical features of the novel urethane elastomers of this invention. The imino hydrogen atom is reactive toward isocyanates under controlled conditions and thus can be employed in a subsequent cross linking or additive attachment (i.e., dye site, antioxidant, stabilizer and the like) reaction. Reaction generally takes place at 30°–50° C. although higher temperatures can be employed. Thus, these novel urethane polymers can be mixed with polyisocyanates such as the previously mentioned diisocyanates and placed in a mold. The latter is heated under temperatures and pressures used in ordinary rubber processing to yield cured molded objects.

Films and fibers may be prepared from the novel elastomers of this invention by extruding solutions of the fiber- or film-formable elastomers employing conventional techniques for preparing films and fibers. The fibers thus produced may be after-cured by treatment with polyisocyanates under heat and pressure.

As a variation within the scope of the invention, diisocyanates such as 2,4-tolylene diisocyanate and 4,4'-diphenyl methane diisocyanate can be added to the spinning solution to provide cross linking to the dry spun fiber. However it is preferable that cross linking be accomplished by post treatment of the dry or wet spun fiber with diisocyanate prior to the heat setting operation. Since the cross-linking reaction will occur at much lower temperatures than than employed for the heat setting operation the two operations can be stepwise.

Stabilizers, antioxidants, dyes, acid dye sites and other additives may be directly and easily attached to the elastomeric polymer backbone by reaction with the active imino hydrogen atom.

The additives preferably should contain an amine or hydroxyl function that is reactive with an isocyanate. Of course, other types of functional groups which can be coupled to an isocyanate group can be used as the basis of forming the coupling compound. In a preferred mode of operation, the additive is first reacted with a stoichiometric amount of a diisocyanate compound to yield a monoisocyanate compound and the latter is added to the elastomer in the spinning solvent. Obviously with molded articles there is no need for a solvent. Examples of the various types of additives contemplated include (1) as antioxidants, p-aminophenol, and N-phenyl naphthylamine-2; (2) as dye sites, alkali metal salts, for example, sodium and lithium salts of 2-aminoethane sulfonic acid and aniline p-sulfonic acid; (3) as ultraviolet light stabilizers, 4-amino benzophenone and 2-hydroxy-4-(2-hydroxyethoxy)-benzophenone. The attachment of additives may also be accomplished during the heat setting operation. In practice, one tenth to one fifth of the stoichiometric quantity of additive can be employed with good results.

The following example illustrates the preparation of the novel elastomers of this invention and the preparation of a shaped structure therefrom. All parts are by weight unless otherwise specified.

EXAMPLE 1

16.7 grams of 2,4-tolylene diisocyanate is added to 200 grams of dry polytetrahydrofuran having a molecular weight of 1,040 and the mixture is maintained at a temperature of 80° C. for 2 hours. 48.0 grams of 4,4'-diphenylmethane diisocyanate is then added and the temperature of the stirred mixture is maintained at 80° C. for an additional hour and then allowed to cool to room temperature. 840 grams of dimethylacetamide is then added and the mixture is stirred till a homogenous mixture results.

In a separate flask 200 grams of dimethylacetamide is mixed with 23 grams of a 25 percent solution of guanidine (4.76 grams) in ethanol. The homogeneous mixture of the isocyanate capped prepolymer is then slowly added with stirring over a period of about 4 hours to the guanidine solution immersed in an ice water bath. When all the isocyanate has been added, the solution viscosity at about 5° C. is 3,240 poise. Upon warming to room temperature the solution viscosity decreases to 1,360 poise.

The thus-formed polymer has a hard segment that can be represented by the formula

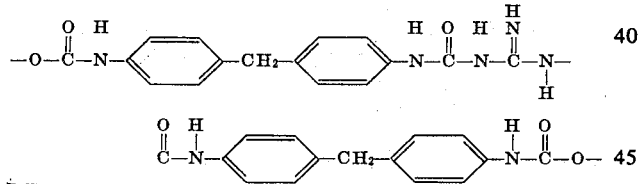

This elastomer in dimethyl acetamide solution is cast into a film in the conventional manner and the resultant film exhibits the properties listed below. Orientation is achieved by stretching the test specimens four times to 80 percent of break elongation prior to testing. Orientation and testing are accomplished by use of an Instron machine.

|  | Tensile Strength (p.s.i.) | Elongation (%) | Elastic Recovery (%) | I.V. in DMAc |
|---|---|---|---|---|
| Unoriented | 4,820 | 1,659 | 100 | 1.05 |
| Oriented | 7,547 | 926 | 100 | 1.05 |

EXAMPLE 2

10.6 grams of p-aminophenol antioxidant and 23.6 grams of 4,4'-diphenylmethane diisocyanate are each dissolved at room temperature in 50 milliliters of dimethylacetamide. These two solutions are mixed together at room temperature. The resultant solution is added to the elastomer solution of example 1 prior to casting. The resultant film contains chemically attached antioxidant.

EXAMPLE 3

Example 2 is repeated with the exception that the elastomer solution is dry spun by conventional manner into filaments containing chemically attached antioxidant.

EXAMPLE 4

Example 2 is repeated with the employment of 21.3 grams of N-phenyl naphthylamine-2 in place of the p-aminophenol with equally good results.

EXAMPLE 5

Example 3 is repeated with the employment of 12,8 grams of lithium 2-aminoethane sulfonate dye site in place of the p-aminophenol. The spun filaments contain chemically attached dye site.

EXAMPLE 6

Example 2 is repeated with the employment of 17.4 grams of lithium aniline p-sulfonate dye site in place of the p-aminophenol. The film contains chemically attached dye site.

EXAMPLE 7

Example 2 is repeated with the employment of 19.2 grams of 4-amino benzophenone ultraviolet light stabilizer in place of the p-aminophenol. The film contains chemically attached ultraviolet light stabilizer.

The novel elastomers can be used in the preparation of tires, inner tubes, belts, hose and tubing, wire and cable jackets, footwear, sponges, coated fabrics, fibers, filaments, bristles, films, woven and nonwoven fabrics, felts, papers and a wide variety of coated or molded articles in the same manner as such prior art elastomers have been employed.

Numerous other variants of the herein disclosed products and processes within the spirit of the present invention will be apparent to one skilled in the art.

What is claimed is:

1. A process for incorporating an additive containing a functional group which is chemically reactive with an isocyanate group into a polyurethane elastomer shaped article, said polyurethane elastomer having been formed by the chain extension in solution of a urethane prepolymer with guanidine, which process comprises chemically attaching said additive to a diisocyanate compound to form in solution a monoisocyanate compound and coupling said additive to said polyurethane elastomer by reacting the remaining isocyanate group of said monoisocyanate compound with an active imino group of the guanidine segment of said polyurethane elastomer.

2. The process of claim 1 wherein said additive contains an amine or hydroxyl functional group which is chemically reactive with an isocyanate group.

3. The process of claim 2 including the additional step of forming into said shaped article.

4. The process of claim 2 wherein said polyurethane elastomer is prepared by chain extending a urethane prepolymer with guanidine and comprises a copolymer consisting essentially of repeating structural units represented by the formula:

$$\left[\left(\overset{O}{\underset{\|}{C}}-\overset{H}{\underset{|}{N}}-B-\overset{H}{\underset{|}{N}}-\overset{O}{\underset{\|}{C}}-R\right)_m\left(\overset{O}{\underset{\|}{C}}-\overset{H}{\underset{|}{N}}-B-\overset{H}{\underset{|}{N}}-\overset{O}{\underset{\|}{C}}-\overset{H}{\underset{|}{N}}-\overset{\overset{H}{\underset{|}{N}}}{\underset{\|}{C}}-\overset{H}{\underset{|}{N}}\right)_n\right]$$

wherein R is the polymeric residue remaining after removal of the terminal active hydrogen atoms from a difunctional organic polymer represented by the formula:

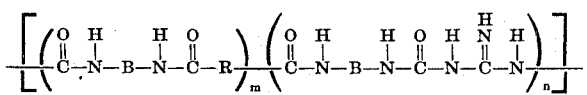

and having a melting point below about 60° C. and a molecular weight between about 700 and 5,000 and wherein $x$ has a value of 0, 1 or 2; Q is the polymeric residue remaining after removal of the terminal active hydrogen atoms from a difunctional organic polymer H—Q—H having a melting point below about 60° C. and a molecular weight above about 230; B and B' are nonpolymeric divalent organic radicals inert to isocyanate groups and representing the residue of the diisocyanate compounds B(NCP)$_2$ and B'(NCO)$_2$, respectively and $m$ and $n$ are positive integers.

5. The polyurethane elastomer of claim 4 wherein the difunctional organic polymer HQH is selected from the group consisting of poly(alkylene oxide) gylcols, hydroxy-terminated polyesters and hydroxy-terminated polylactones.

6. A polyurethane elastomer prepared by chain-extending in solution a urethane prepolymer with guanidine, said polyurethane elastomer comprising a copolymer consisting essentially of repeating structural units represented by the formula:

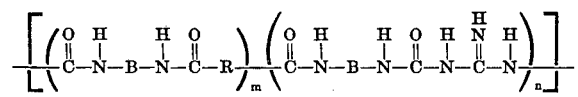

wherein R is the polymeric residue remaining after removal of the terminal active hydrogen atoms from a difunctional organic polymer represented by the formula:

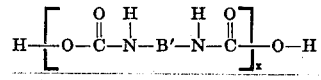

and having a melting point below about 60° C. and a molecular weight between about 700 and 5,000 and wherein $x$ has a value of 0, 1 or 2; Q is the polymeric residue remaining after removal of the terminal active hydrogen atoms from a difunctional organic polymer H—Q—H having a melting point below about 60° C. and a molecular weight above about 230; B and B' are nonpolymeric divalent organic radicals inert to isocyanate groups and represent the residue of the diisocyanate compounds (BNCO)$_2$ and B'(NCO)$_2$, respectively; and $m$ and $n$ are positive integers, said polyurethane elastomer containing additive attached through a diisocyanate compound to the imino group of the guanidine segment of said polyurethane elastomer, said attachment being carried out be reacting in solution.

7. The elastomer of claim 6 wherein the difunctional organic elastomer HQH is selected from the group consisting of poly(alkylene oxide) glycols, hydroxy-terminated polyesters and hydroxy-terminated polylactones.

8. A shaped article formed from the polymer of claim 7.

9. The shaped article of claim 8 in the form of a film.

10. The shaped article of claim 8 in the form of a fiber.

11. The elastomer of claim 7 wherein HQH is polycaprolactone.

12. The elastomer of claim 7 wherein HQH is polytetrahydrofuran

13. A film formed from the elastomer of claim 12.

14. A fiber formed from the elastomer of claim 12.

* * * * *

PO-1050
(5/69)

UNITED STATES PATENT OFFICE
CERTIFICATE OF CORRECTION

Patent No. 3,627,735　　　　　　　Dated December 14, 1971

Inventor(s) Louis E. Trapasso

It is certified that error appears in the above-identified patent and that said Letters Patent are hereby corrected as shown below:

The second formula in claim 4 should be

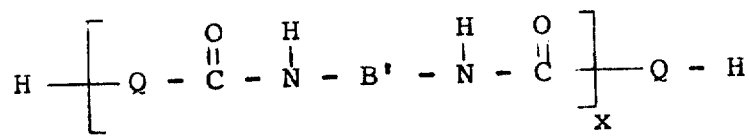

Column 5, line 9, "B(NCP)$_2$" should read -- B(NCO)$_2$ --

Claim 6, the second formula should be

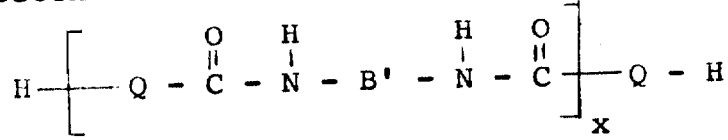

Claim 7, line 2, the word "elastomer" should be -- polymer --.

Claim 8, the word "polymer" should be -- elastomer --

Signed and sealed this 28th day of November 1972.

(SEAL)
Attest:

EDWARD M. FLETCHER, JR.
Attesting Officer

ROBERT GOTTSCHALK
Commissioner of Patents